United States Patent [19]
Beydler

[11] 3,742,499
[45] June 26, 1973

[54] PULSE DOPPLER MOVING-TARGET RADAR

[75] Inventor: William W. Beydler, Laurel, Md.

[73] Assignee: Westinghouse Electric Corporation, Pittsburgh, Pa.

[22] Filed: May 25, 1971

[21] Appl. No.: 146,743

Related U.S. Application Data

[63] Continuation-in-part of Ser. No. 797,932, Feb. 10, 1969, abandoned.

[52] U.S. Cl. .............................. 343/7.7, 343/5 DP
[51] Int. Cl. .............................................. G01s 9/42
[58] Field of Search ...................... 343/5 DP, 1.7, 8, 343/9

[56] References Cited
UNITED STATES PATENTS

| | | | |
|---|---|---|---|
| 3,422,435 | 1/1969 | Cragon et al. | 343/5 DP |
| 3,388,377 | 6/1968 | Folsom et al. | 343/5 DP |
| 3,386,077 | 5/1968 | Molho | 343/5 DP |
| 3,611,375 | 10/1971 | Chambers et al. | 343/7.7 |
| 3,560,972 | 2/1971 | Taylor, Jr. | 343/7.7 |
| 3,623,096 | 11/1971 | Morris | 343/7.7 |
| 3,140,486 | 7/1964 | Gillmer | 343/8 |
| 3,404,399 | 10/1968 | Eschner | 343/7.7 |

Primary Examiner—Malcolm F. Hubler
Attorney—F. H. Henson and E. P. Klipfel

[57] ABSTRACT

Multi-channel pulse-doppler moving-target radar with a single filter bank is disclosed in which received signals are passed through range channels during a succession or cycle of range sub-intervals of the main interval between transmitted pulses. Wave signals of the doppler shift frequency are derived from these range signals and these are sampled and converted into digital values, typically made up of six digit words, and stored in a three-dimensional, typically ferrite, memory core in the order in which they are received; that is, the magnitudes for all channels in succession during a cycle of first sample interval, the magnitudes for all channels during a cycle of second sample interval and so on. During storing the core is filled level by level along the heighth. The signals in the memory core for each channel in its turn; that is, all signals for the first channel, then all signals for the second channel, and so on are then passed through a filter bank and the data correlated. The signals are removed from the core in groups in a rearrangement of the order in which they are stored but in the same level by level order. The desired speed in presenting the data is achieved by removing a plurality of words from the memory core during each successive removal operation. The storage and removal is effected by selective operation of counters. The invention provides facilities for operating into all channels with a single filter bank without complicated storage and removal functions and without a core requiring complicated matrix wiring.

10 Claims, 7 Drawing Figures

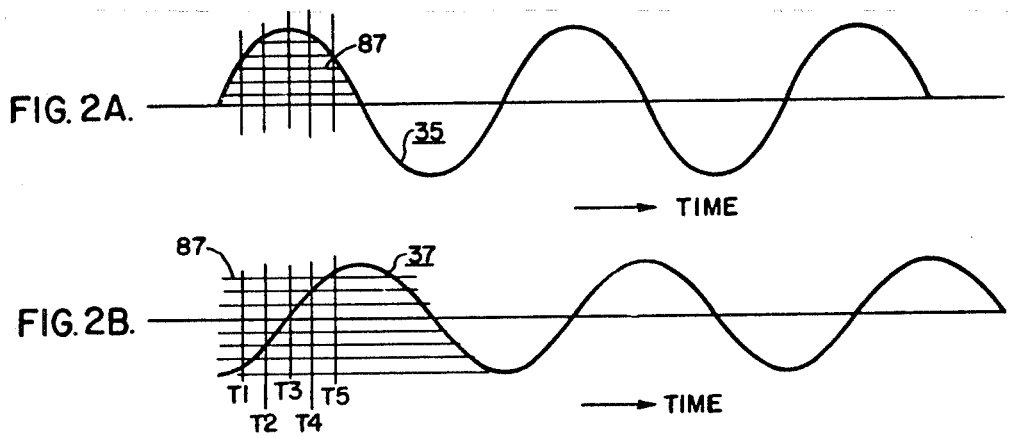
FIG. 2A.
FIG. 2B.
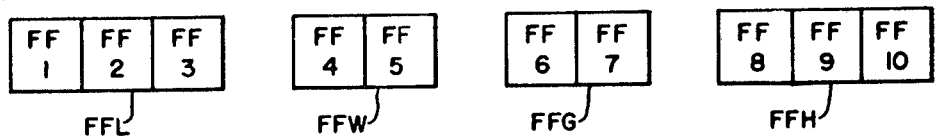
FIG. 4.
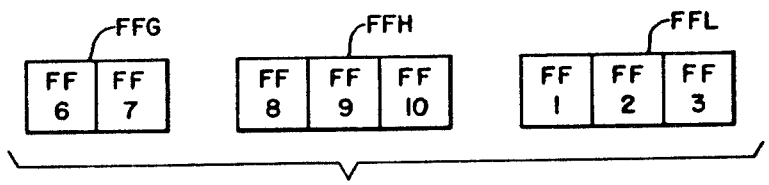
FIG. 5

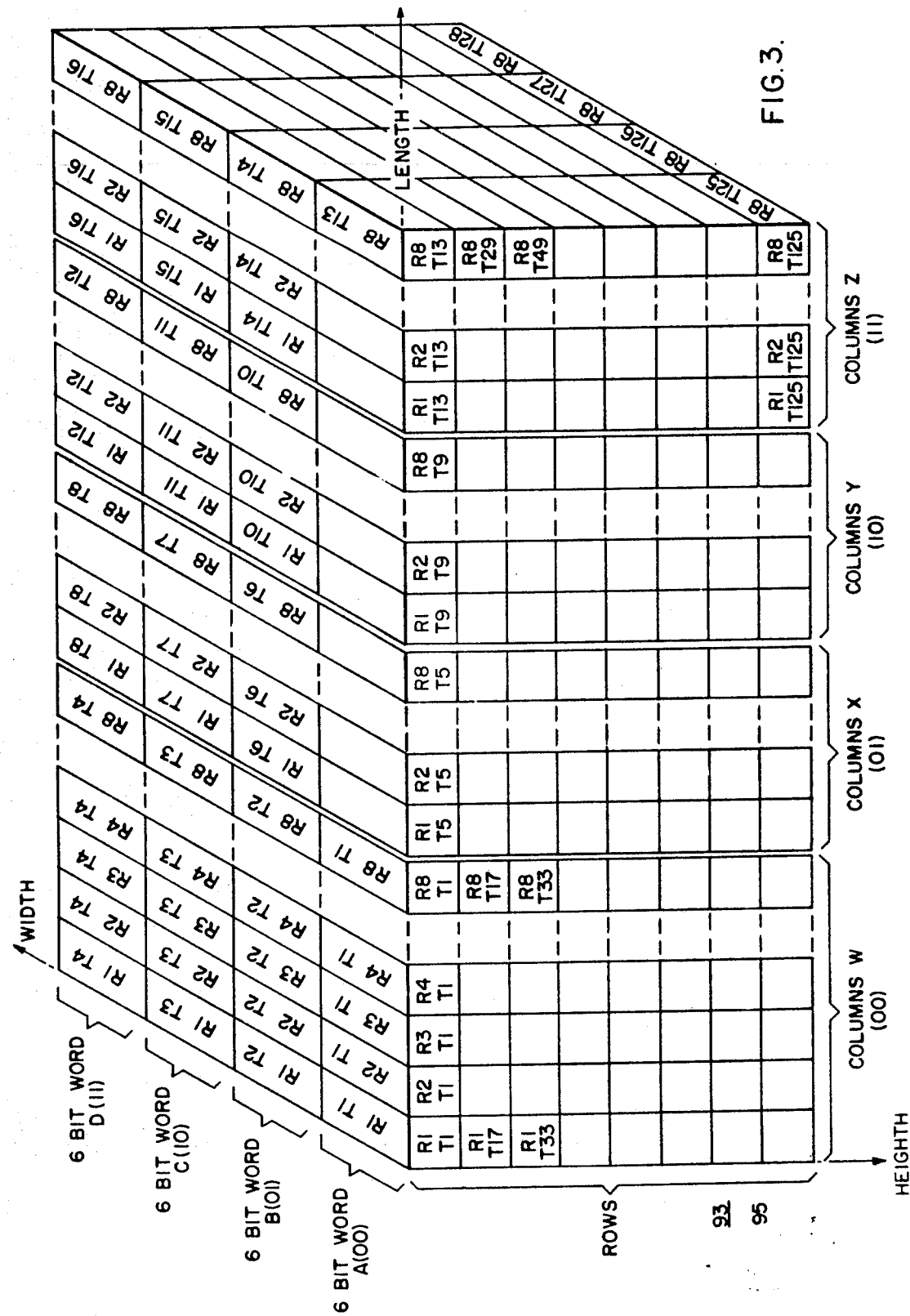

PULSE DOPPLER MOVING-TARGET RADAR

CROSS-REFERENCE TO RELATED APPLICATIONS

This application is a continuation-in-part of application Ser. No. 797,932, filed Feb. 10, 1969, now abandoned.

BACKGROUND OF THE INVENTION

This invention relates to the communication art and has particular relationship to multi-channel or multi-gate, pulse-doppler moving-target-radar systems. In such radar pulses of wave trains are transmitted and the resulting reflected signals received are channeled by means of range gates, through a plurality of range channels which are essentially separate receivers. The outputs of the channels are passed through filters and correlated, producing data indicative of the position and velocity of the targets under observation. The range gates operate successively, each gate passing signals reflected from targets if any at the range corresponding to the gate, through the range channels for filtering. In a modern high-resolution radar the range gates open for very short duration, of the order of 1 microsecond, and successive gates are open at intervals of a fraction of a microsecond so that the ranges extend in small increments from the radar platform. Signals of the Doppler-shift frequency are derived from the range-gate signals and these are filtered and correlated to provide data on the targets.

In accordance with the teachings of the prior art a separate filter bank is provided for each channel. Such filter banks are costly and introduce complexity in the use of the radar systems in correlating signals with target velocity and function. It is an object of this invention to eliminate the multiplicity of filter banks.

SUMMARY OF THE INVENTION

The multiplicity of filter banks can be eliminated by storing temporarily in memory means samples of the signals received by all channels during each multi-cycle sampling operation and then multiplexing the stored signals through a single filter bank and correlating the data passed by this bank. This procedure requires that the signals for each successive sampling cycle, which includes samples taken in succession for all channels (over a short time interval), be stored in the succession in which they are received and then, the signals stored for the various channels, be multiplexed channel-by-channel through the single filter bank. Designating the channels and their range signals as R1, R2, —R$n$ and the sampling intervals T1, T2—T$m$, where each interval corresponds to a cycle of sampling, the signals are stored in the order R1T1, R2T1, —R$n$T1 but are multiplexed in the order R1T1, R1T2—R1T$m$; R2T1, R2T2—R2T$m$; —R$n$T1, R$n$T2—R$n$T$m$.

This difference between the order of storage in the memory means and the order of recovery or removal from the memory means introduces complexity in the operation of the memory means and in addition the storage and recovery or multiplexing signal-by-signal consumes a substantial time interval which may be excessive in many situations.

It is an object of this invention to overcome these difficulties and to provide a method of operating multi-channel, single-filter-bank, pulse-doppler, moving-target radar and also to provide a multi-channel, single-filter-bank, pulse-doppler, moving-target radar system, in the practice and use of which the storage and removal or multiplexing of stored signals shall be effected relatively simply and the data on the targets picked up shall be presented in a relatively short time interval.

To accomplish the above object, the memory means is in accordance with this invention a memory core in which the memory elements are arranged in three dimensions, length, width and heighth. Typically the core may have ferrite memory elements and the storage may be effected by coincident current. The data may be stored in the memory elements typically as six-bit-digital words. The signals as they are received, successively during the sampling cycles, are multiplexed to an analogue-to-digital converter and the resulting digital magnitudes or signals are stored in the elements in rows extending along the length and width at successive levels extending in columns along the heighth. The columns are subdivided into groups or blocks.

The rows are filled level by level from one end of the heighth to the order. At each element in a row along the length the corresponding row along the width is filled, then the corresponding row at the next element along the width is filled and so on until a level of rows is filled; then the next level is filled. The magnitudes in the core are then removed row-by-row at each level. The order of removal by levels is the same as the order of recording but the order of rows is changed and in addition all signals in the rows along the width are removed simultaneously. The removed signals are multiplexed into a digital-to-analogue converter and the resulting analogue signals are passed through the filter bank and correlated.

The core is controlled by a plurality of counters, which may be described as address counters, and which operate to select the address of the individual storage elements for storing and removal. Four sets of counters operate during storing to select respectively, in sequence, (1) the number of the column of any block of the columns which extend along the height dimension of the address; (2) the number of the row extending along the length dimension of the address; (3) the number of the block of columns; (4) the number of the row extending along the width dimension of the address. During removal the sequence of operation of the counter sets is changed to carry out the removal without requiring complicated equipment or wiring. On removal counter set (3) above operates first to select the group or block of columns of the address of the elements from which the data is to be removed; counter set (4) operates to select the number of the row extending along the width on the group or block of selected columns; then counter set (1) operates to select the number of the column in the block of the elements from which the data is to be removed. All data in the width dimensions (now along the length) is removed from the selected row simultaneously. On removal the data for each range is removed level by level in the order in which the data is recorded in the levels.

A significant feature of applicant's invention is that it correlates data from a large number of sweeps each of which is subdivided by range gates into a large number of ranges. Typically there may be 128 sweeps or more in the practice of applicant's invention. Each item of data for each sweep has a separate address in the memory core where it is recorded as a 6-bit word; that is, the data for each range for each sweep is recorded in an identifiable address in the core. Assuming eight ranges, R1 through R8, there are 1024 such items of data, R1T1 through R8T128, each recorded in a separate one of 1024 addresses. The data is removed to the filter as successive 24-bit words for each range in its turn. This system requires a memory with 6144 bits and in addition the command bits necessary to carry out the storing and removing operations and the bits for temporary register 101.

BRIEF DESCRIPTION OF THE DRAWINGS

For a better understanding of this invention, both as to its organization and as to its method of operation, together with additional objects and advantages thereof, reference is made to the following description taken in connection with the accompanying drawings, in which:

FIGS. 2A and 2B are graphs illustrating the operation of the apparatus shown in FIG. 1;

FIG. 3 is a diagrammatic view showing the manner in which the data is stored in the core in the practice of this invention;

FIGS. 4 and 5 are diagrammatic views showing the relationship of the counter sets respectively, in recording data in the core and removing data from the core in the practice of this invention.

DESCRIPTION OF THE PREFERRED EMBODIMENT

Figure 1:
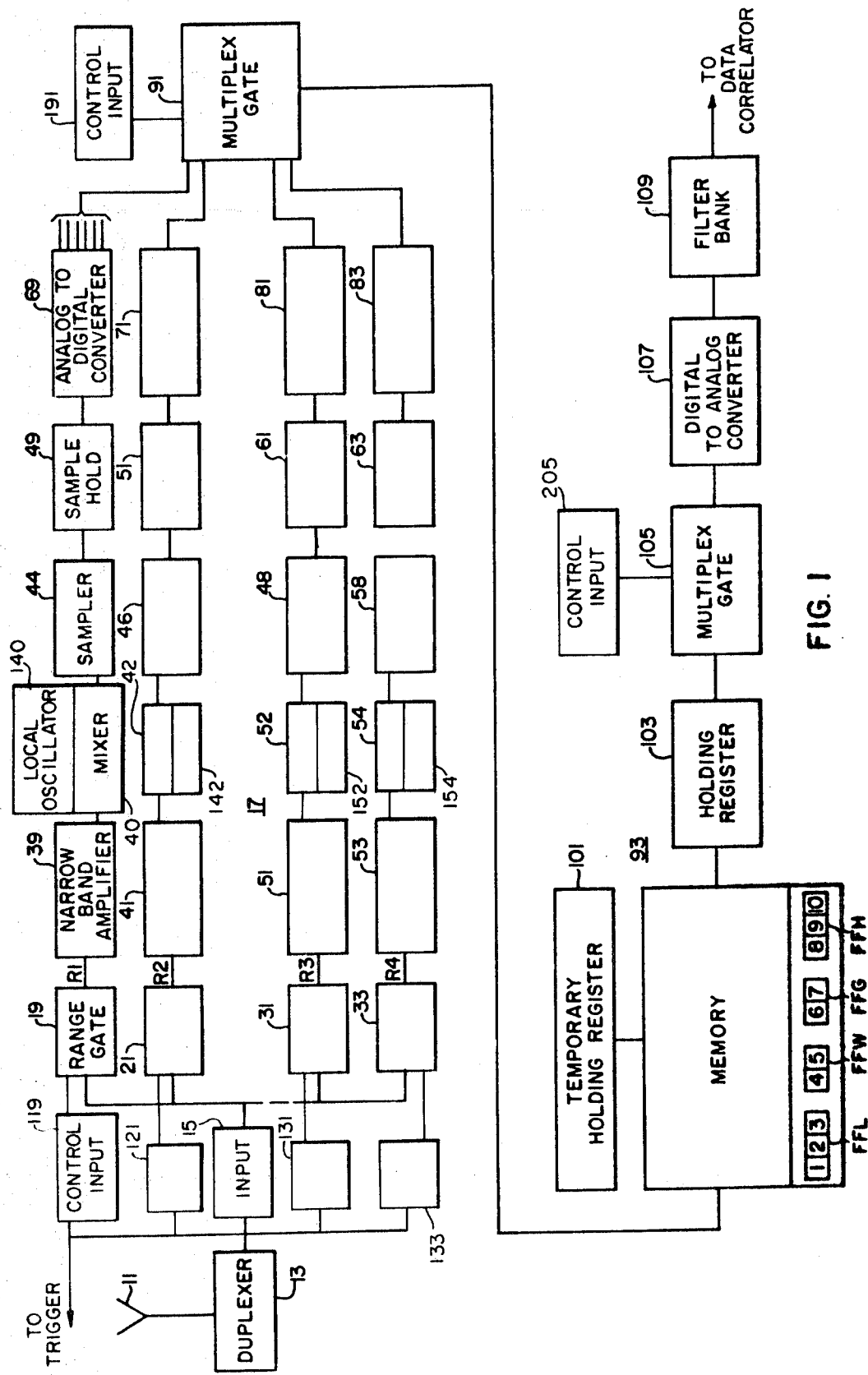
FIG. 1 is a diagrammatic view showing a multichannel, pulse-doppler, moving-target radar system embodying this invention and used in the practice of this invention.

The apparatus shown in FIG. 1 is a receiver for a multi-channel, pulse-doppler, moving-target radar system. In such a system pulses of predetermined duration containing a predetermined number of coherent radio frequency waves are transmitted. Typically, these pulses are transmitted successively at three different repetition rates. The pulses are reflected from the objects on which they impinge and the reflected wave trains differ in frequency from the transmitted wave trains in accordance with the velocity of each object or target and radar-system platform relative to each other as determined by the Doppler principle. Velocity of each target is determined by measuring the Doppler shaft. Range is determined by comparing the instants at which reflected waves of different repetition rate coincide in phase.

The receiver includes an antenna 11 which may also serve for transmission and may be connected between the transmitter (not shown) and the receiver through a duplexer 13. The receiver also includes an input 15 which may be composed of a mixer and I-F amplifier.

The signal from the input 15 is usually a complex intermediate-frequency signal of square wave form made up of the pulses of different frequency reflected from the objects on which the transmitted pulses impinge. This signal is passed through the range channel network 17. The network 17 serves to separate out the different waves, if any, received at different successive ranges of the region into which the transmitted signal is projected. There may be a large number (for example, 50 of such ranges). To simplify consideration only eight ranges are assumed.

The network 17 includes a plurality of range gates 19, 21, 31, 33. Only four of the range gates are shown but, as indicated by the broken vertical line from the input 15, there are usually a larger number; eight gates are indicated. The range gates are normally closed but are opened in succession to permit sampling signals to pass. The time interval between the openings of successive range gates 19 through 33 is of the order of a fraction of a microsecond (in a high-resolution system) to a few microseconds, and the total interval for a cycle of range-gate openings is measured in micro-seconds and, as compared to the pulse durations, the range gates 19 through 33 may be regarded as having opened simultaneously during each cycle.

The range gates 19 through 33 are controlled through control inputs 119 through 133 and the openings of the range gates are synchronized with the triggering of the transmitted pulses. The range gates essentially divide up the interval between successive transmitted pulses into sub-interval, each sub-interval occurring at a time instant when a signal reflected pulse from a target at a particular range would pass through the corresponding gate. The ranges are designated R1 through R8 in the drawings. If the range gates open in the order R19, 21—31, 33, R1 is the lowest range and R8 is the highest. The range gates are essentially broad band amplifiers capable of passing this complex square wave signal reflected by any targets at the range.

The signal passed by each range gate 19, 21, 31, 33 is passed through a corresponding narrow band amplifier 39, 41, 51, 53 and mixer 40, 42, 52, 54. A local oscillator (tuned to a Doppler shift) 140, 142, 152, 154, respectively is connected to each mixer. Each narrowband amplifier 39 through 53 is tuned to the center frequency of the signal passed and the corresponding mixer and local oscillator 40 through 54 operate to derive a resulting signal at the output which is generally sinusoidal and of Doppler shift frequency or frequencies corresponding to the target or targets in the corresponding range. Typically this Doppler-shift frequency may be of the order of 25 kilo-cycles.

The output of each mixer 40, 42, 52, 54 is passed to a sampler 44, 46, 48, 56 which samples the waves of the Doppler frequency at short intervals. Each sampler 44 through 56 samples during each sweep of antenna 11 a complete cycle of signals passed by all gates 19 through 33 at successive instants T1, T2—T127, T128. In this application only 129 sampling instants are considered to simplify the explanation. In an actual system there may be as many as 2,000 sampling instants for each of 50 gates.

The signals, if any, passed by a range gate is a signal or signals reflected by a target or targets in the range corresponding to the gate. This signal or signals is of generally square wave form since the transmitted pulse train is of such wave form and has a frequency or frequencies corresponding to the relative velocity or velocities of the targets.

The signals at the outputs of the mixers 40 through 54 are illustrated by the graphs in FIGS. 2A and 2B. For each graph magnitude (voltage) is plotted vertically and time horizontally, vertically aligned points on each graph representing the same instants. The curves 35 and 37 in FIGS. 2A and 2B represent two of the waves made up of sample signals. The vertical lines at times T1, T2, T3, T4—etc. represent the instants of sampling during complete cycles of the openings of the gates 19 through 33. The sampling cycles are designated T1, T2—T127, T128. In a typical situation where there are eight range gates 19, 21, 31, 33, and, if there are target signals in each range, there are eight waves as shown in FIGS. 2A and 2B.

The sample signals passed by the samplers 44 through 58 are supplied in sequence to sample-hold registers 49, 51, 61, 63, respectively. The signals in the registers 49 through 63 are analogue signals and they are converted into digital signals by analogue-to-digital converters 69, 71, 81, 83, respectively. The converters 69 through 83 pass digital words corresponding to the waves separated out by the range channels 39 through 53. Typically each converter 69 through 83 are of the 6-bit type, as indicated by the six lines 85 of converter 69, and thus may pass magnitudes from zero through 64. These magnitudes represent sampling magnitudes of the waves which are passed by the mixer 40 through 54. The available magnitudes are represented by the horizontal lines 87 in FIGS. 2A and 2B. The magnitude passed during any sampling interval T1 through T128 corresponds to the point on a curve 35 or 37 intersected both by a T-line and a line 87. The words passed are designated R1, R2—R7, R8.

The outputs of the converters 69 through 83 are multiplexed through multiplexer gate 91 controlled by the control input 191 and stored in memory 93 in the order in which they are received. The core memory is typically of the type having ferrite storage elements and operates by normal coincident current. The memory 93 is of the three-dimensional type and is shown in detail in FIG. 3. The individual rectangular blocks 95 represent storage elements and in FIG. 3 some of the words are shown in the storage elements. Each word is identified by a range R1 through R8 and a gating instant T1 through T128. The magnitude for the first interval T1 out of range gate 19 is designated R1T1, the magnitude for the second wave R2 stored for the first interval T1, R2T1 and so on through R8T128 which is the magnitude of the eighth wave stored for the 128th. interval.

For convenience the addresses of the memory components 95 of the memory 93 are defined in terms of length (along the length of the drawing in FIG. 3), width (into the drawing in FIG. 3) and heighth (along the width of the drawing in FIG. 3). The memory 93 is subdivided into blocks (4 typically) W, X, Y, Z, each block being composed of a plurality of columns of memory elements. Typically, a block has a length of eight elements, a width of four elements, and a heighth of eight elements; a total of 216 elements.

The storage of the digital data from the multiplex gate 91 is controlled by sets of flip-flop digital counters FFL, FFW, FFG, FFH. FFL determines the column address in each group W, X, Y, Z of the memory element in which data is to be stored. FFL consists of three flip-flop 1, 2, 3 which count 8, the 000 count defining an address in the extreme left-hand column of each group and the other counts in sequence defining an address in the correspondingly numbered column from the left. For example, 010 defines an address in the third column of any group W, X, Y, Z and 111 an address in the eighth column. FFW consists of two flip-flops 4, 5 and sets the address, in the column of any group W, X, Y, Z, of a selected storage element along the width of the memory 93. For example, 00 represents the outermost element (with respect to the drawing), 01, the next, 10, the next and 11 the innermost element. FFG consists of two flip-flops 6, 7 and sets the group or block W, X, Y or Z of the address of a storage element. The setting 00 sets W, 01, X, 10, Y and 11 Z. Counter FFH consists of three flip-flops 8, 9, 10 and sets the row address of a selected element in a column of a group. FFH counts downwardly (with reference to the drawing); 000 setting an address in the uppermost row and 111 an address in the lowermost row.

In recording data the counters operate in the order FFL, FFW, FFG, FFH. That is, with counters FFW at 00, FFG at 00 and FFG at 000, counter FFL counts from 000 to 111. Then FFL returns to 000 and FFW counts 01 while the others remain unchanged. Now FFL again counts 000 to 111 and returns to 000. FFW then goes to 10 and the above is repeated. This continues until FFL and FFW both return to 000 and 00. Then FFG goes through its cycle 00, 01, 10, 11, 00 and, at each setting, counters FFL and FFW go through their cycles. Finally FFH passes through its cycle 000, 001, 010, 011, 100, 101, 110, 111, 000 and at each setting the complete above-described operations of FFL, FFW, and FFG takes place. FFL may be regarded as counting 1's, FFW, 10's, FFG, 100's and FFH, 1,000's.

The counters FFL, FFW, FFG, FFH, counting in the above-described order, cooperate with the multiplex gate 91 and the memory to store the magnitudes received during cycles T1, T2—T128 in sequence from left-to-right, in length and group order, from front to back in width and from top to bottom in height. Thus, the data for ranges R1 through R8, received during the first sampling interval, are stored in the elements of the top outermost row of group W, as indicated by R1T1 through R8T1, the data received during the second sampling interval in addresses in the topmost second row of the first group, as indicated by R1T2 through R1T8. As shown in FIG. 3, during the storing, the rows of all groups W, X, Y, Z are each in its turn filled before the next row is started. The top row of the memory 93 in FIG. 3 includes all the data for sampling cycles from T1 through T16, the second row starts with T17, the third with T33 and so on.

The receiver shown in FIG. 1 includes a temporary holding register 101. This register 101 is required because, in storing data in each row along the width, the currents which flow during the storing of new data in the row affect the storage elements in which old data is already stored. For example, if R1T1 is stored before R1T2, the currents storing R1T2 would affect R1T1. In the practice of this invention the old data stored in a row column is removed to the temporary register 101, then the old data is transferred from register 101 simultaneously with the storing of new data. Thus, in storing R1T2, R1T1 is first removed to register 101, then R1T1 is returned simultaneously with the storing of R1T2; likewise R1T1 and R1T2 are transferred to register 101 and returned simultaneously with the storing of R1T3; and so on.

After the data R1T1 through R8T128 is stored in memory 93 this data is transferred to holding register 103. The transfer is controlled by counters FFG, FFH and FFL in sequence and is carried out in corresponding width rows of groups W, Z, Y, Z in sequence from left to right and from top to bottom. The data in register 93 is removed for each range in the same order by levels as it is recorded but by 24-bit words rather than 6-bit words. Counter FFG selects the group or block address for the removal, FFH, the row, and FFL the column address. With FFG set at 00 the group address is in W, with FFH set at 000 the row address is the top row and with FFL set at 00 the column address is the left-hand column of W. Under the control of FFG at 00, FFH at 000 and FFL at 000, items R1T1, R1T2, R1T3, and R1T4 would be removed. FFG is now set at 01, FFH at 000 and FFL at 000, R1T5, R1T6, R1T7 and R1T8 would be removed.

FFG first goes through its cycle of 00, 01, 10,11,00. The FFH goes through its cycle 000, 001, 010, 011, 100, 101, 110, 111, 000 and at each setting of FFH, FFG goes through its complete cycle. Then FFL goes through its cycle 000, 001, 010, 011, 100, 101, 110, 111, 000 and for each setting of FFL, FFH and FFG go through the cycles described above. FFG may be regarded as counting 1's, FFH, 10's and FFL, 100's.

The data from holding register 103 is multiplexed through a multiplex gate 105 controlled by control input to a digital-to-analogue converter 107. The analogue data in the form of waves R1 through R8 as determined by the sampling is passed through a single filter bank 109 and correlated to identify the range of the objects detected by a data correlator (not shown).

The following summary is presented in an effort to aid those skilled in the art in understanding and practicing this invention.

In prior-art pulse doppler radar the returns are channeled through range-gated channels or receivers into a filter bank where they undergo a frequency analysis. The analysis is performed over a specific number of sample times. A filter bank is, in accordance with the teachings of the prior art, required at the output of each range-gated channel. If the data from the channel is stored temporarily until all the samples have been taken, then all time samples from each gate can be multiplexed to a single filter bank.

The data which is stored consists of the first time sample taken from each channel, then the second time sample from each channel, etc., until the nth time sample has been taken from each channel. When the data is read out for multiplexing to the filter bank, all consecutive time samples are read out for the first range-gated channel, then all consecutive time samples for the second range-gated channel, etc., until all the data has been dumped. Typically the data may be handled in this way be a so-called corner-turner memory or an L-buffer.

A memory of this type is usually costly because of the requirement of accessing in both dimensions, writing or recording in one dimension and sensing or removing data in the other. A special wiring of a matrix of memory elements is also required.

In the practice of this invention a unique addressing and memory organization is provided which performs the L-buffer function on radar data without the usual attendant high cost and large hardware requirements.

A digital storage system is used for the radar data. The data from the range-gated channels are multiplexed, typically, to a six-bit analogue-to-digital converter 69 and from there it is stored in a ferrite core memory 93. The core memory 93 used in a normal coincident-current type.

Referring to FIG. 3 the data is stored in the coincident-current core stack 93 under control of the address counters FFL, FFW, FFG, FFH as shown in FIGS. 3, 4, 5. For the illustration, eight receiver channels are used and 128 time samples are taken.

In storing the address counters count in a binary fashion with counter 1 of FFL being the least significant bit and counter 10 of FFH the most significant bit. FFL control the particular column (1 of 8) within each of the four groups or blocks of columns W, X, Y and Z. FFW controls which of the elements A, B, C or D (FIG. 3) is selected. FFG controls which one of the four groups of columns W, X, Y or Z is selected. For remaining FFH select the particular row.

The counters FFL, FFW, FFG, FFH starting out in the all zeroes state cause the 6-bit word $R_1T_1$ to be written first. Then as the counter advances $R_2T_1$ is written, then $R_3T_1$ etc. until $R_8T_1$ is written. At this point FFW is set to the one state and the words $R_1T_2$, $R_2T_2$, etc., written as the counters continued to advance. By the time FFW is back in the zero states, all 6-bit words through $R_8T_4$ are written. The counters advancing would then start the process over again in the X column group. This is repeated for all four groups of columns W, X, Y, Z until the entire first row is written. The process then starts over for the second row and continues until all time samples from all channels 49 through 63 have been written.

The operation of the ferrite core, coincident-current memory is such that when one 6-bit word is selected in a particular row-column, all four 6-bit words are acted upon. That is, the memory organization of this memory 93 is such that a 24-bit word is selected. This presents no difficulty because a read/write cycle is entered into with the cooperation of temporary holding register 101 during the writing of each word. During the read half of the cycle, provision is made for retaining the data read out in register 101 of the 6-bit words which were previously written and for rewriting it in memory 93 along with the new 6-bit word.

When the entire memory stack is loaded and ready to be read out the address counters FFG, FFH and FFL are gated so that they operate as shown in FIG. 5.

The counters still count in a binary fashion but flip-flop 6 of FFG now operates as the least significant bit and flip-flop 3 of FFL as the most significant bit. FFW is not used. The counters FFG, FFH and FFL control the same rows-columns as during the write cycle.

The counters start out in the all zeroes state again and a read only half cycle is performed. The four 6-bit words $R_1T_1$, $R_1T_2$, $R_1T_3$ and $R_1T_4$ are read out at one time and transmitted to a digital-to-analogue converter 107 and then onto the filter bank 109. When the address counters advance they now select the first row-column of the X-column group consisting of the four six-bit words $R_1T_5$, $R_1T_6$, $R_1T_7$, and $R_1T_8$. As the counters continue to advance all time samples for the first range-gated channel are read out in consecutive order. After this has been accomplished all time samples for the 2nd range-gated channel are read out in the same manner, etc., until the entire memory contents have been dumped. The function of the L-buffer has thus been performed. The read out of the data is about eight times faster than the write in because four 6-bit words are read out at once during a read-only half cycle.

Any number of time samples can be stored simply by increasing the number of words contained in the memory 93. The number of range-gated channels handled can be increased either by increasing the memory word capacity (constant data rate) or by operating a number of memories in parallel (total time available constant).

Figure 6:
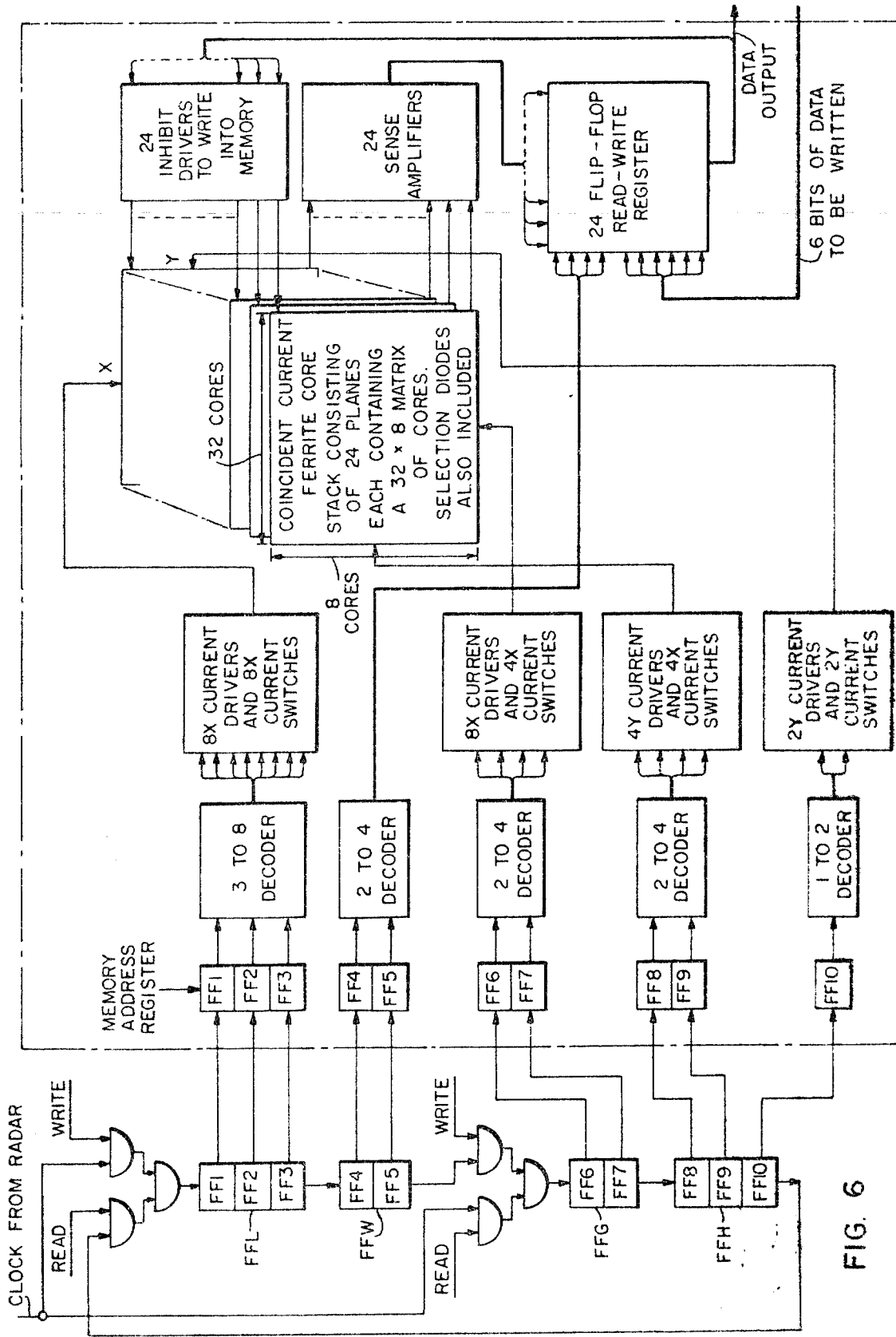
FIG. 6 is a block diagram illustrating the manner in which data is stored in the memory core shown in FIG. 3.

To aid in the understanding of this invention the operation of the apparatus in storing in, and removing data from the memory 93 will now be described with reference to FIG. 6. In FIG. 6 the blocks are labeled to correspond to various hardware and software parts of the memory 93.

The flip-flops FFL, FFW, FFG and FFH are programmed by conventional computer programming procedures controlled by a clock to select successive addresses in the memory 93 in which the signals received by the radar and converted into digital numbers are to be recorded. The clock is synchronized with the operation of the radar; that is, with the triggering of the transmitted signal, with the control of the range gates 19 through 33 through control inputs 119 through 133, with the control inputs 191 and 205 and the like. In writing the data the counters FFL counts 8 for each of the four settings of FFW, FFW counts four for each of the four settings of FFG, and FFG counts four for each of the eight settings of FFH. This mode of counting is readily programmed. Each count selects a unique address in the memory 93 in which a corresponding item of received data is recorded as a 6-bit word. (page 8, line 25). There is a one-to-one correspondence between the data and the address as shown in FIG. 3. For example, the information received from the first range R1 during the 9th sampling interval T9 is written in the address at the outer 6-bit space of the upper left-hand corner of the third block and is identified R1T9.

In reading out the data the counters FFG, FFH and FFL are programmed to count. FFG counts four in each of the eight settings of FFH and FFH counts eight in each of the eight settings of FFL. In this case each count identifies the address of a whole row along the width or four 6-bit words, in all 24 bits. Thus FFG = 01, FFH = 001, FFL = 010 identifies the row R3T21, R3T22, R3T23, R3T24, the signals from range 3 picked up during successive intervals T21, through T24.

The temporary transfer into register 101 as described in lines 10 through 24 of page 11 and in lines 17 through 27 of page 14 is also programmed into the memory 93.

Coincident current memories are described in the literature, typically in, "Square-Loop Ferrite Circuitry" by C. J. Qurtly-Prentice-Hall Inc. Particular reference is made to Chapter 3 — Coincident Drive Storage Systems.

In FIG. 6 a block diagram of a normal coincident core memory is shown within the dash-dot rectangle. This diagram corresponds to the memory 93. Within the diagram there are shown 24 planes each containing a 32 × 8 matrix of cores. The 24 planes correspond to the four groups of cores A(00), B(01), C(10), D(11) along the width dimensions of FIG. 3. Each group has six bits and the four groups have 24 bits. The coincident-current memory has one plane per bit; there are then 24 planes. Each plane is 32 cores long (8 × 4) (Length FIG. 3) and 8 cores high (Heighth FIG. 3).

The feeding of information into the memory is controlled by timing signals delivered along the line labeled "clock from radar." These timing signals are synchronized with the sync signals which trigger the transmitted pulses of the radar and are included in a radar of the type under consideration to coordinate the received data with the transmitted signal.

The timing signals are fed to gates near upper left-hand corner and near center on the left, each of which causes the flip-flop FFL, FFW, FFG, FFH to operate at the instants signaled by the clock in the "read" or "write" mode as conditioned by the lines labeled "READ" and "WRITE." When the memory is in a "WRITE" mode, the clock from the radar is conditioned to first go to FFL (upper gate) and not to FF6. This is for writing 6-bit data into individual address blocks or spaces. When the memory is in a "read" mode, the clock from the radar is first conditioned to go to FF6 (lower gate) and not to FF1. This is for reading 24 bit items out of rows. The "read" and "write" lines on the gates control the opening of the gates and allow the clock signals to pass to the correct FF.

When data from the radar is being written into the memory 93 the upper gate enables the counters to count in the order FFL, FFW, FFG, FFH. This is indicated by the line from "clock from radar" to the upper gate which provides the appropriate actuating pulses. When data is to be read out of the menory to the filter bank 109 the counters read in the order FFG, FFH, FFL. This is indicated by the line from "clock to radar" to the lower gate providing the appropriate actuating pulses.

The line on the left from FF10 (FFH) to the upper gate is for continuing the operation of the counter to the upper FF's during a "read" mode when the radar clock signal first went to FF6. In the same manner, the line from FF5 (FFW) to the lower gate allows operation of the counter to the lower FF's during a "write" mode when the radar clock first went to FF1.

Similar flip-flops 1–10 are shown outside and inside of the broken-line block. Two sets of flip-flops are not essential. The gates could feed directly into the flip-flops in the broken line blocks. As shown the outside flip-flops 1–10 serve for counting and the inside flip-flops 1–10 serve as a holding register. The two functions can be combined. In practice the counters FFL, FFW, FFG, FFH shown outside the dash-dot rectangle could be part of the memory 93 as shown in FIG. 3.

In the operation of the memory 93 an $x$ current is selected by turning on one of eight drivers (controlled by the states of FFL, 2, 3) and one of four switches (controlled by the states of FF6, 7). A $y$ current is also selected by turning on one of four drivers (controlled by the states of FF8, 9) and also one of two switches (controlled by FF10). This is known as a driver-switch selection scheme. The coincidence of the $x$ and $y$ currents is sufficient to switch a core on each of the 24 planes of the core stack shown. This could then be called a 24 bit memory word. The information that was stored in the cores would be detected by the sense amplifiers and transferred to the flip-flop read-write register. It would then be available for use outside of the memory 93.

To write data into the memory, the $x$ and $y$ currents are selected in the same manner as above but the role of drivers and switches is interchanged so the current flows in the opposite direction than for a read operation. All 24 bits of the word would then be rewritten as "ones." If it is desired to write a zero in a particular bit, then in addition to the $x$ and $y$ currents a third current (inhibit) is also run through the cores of a particular plane to cancel the $x$ or $y$ current and thus prevent that particular core or bit from being changed. The information that causes the pattern of ones and zeroes to be written comes from the 6-bit input data word from the multiplexer 91. The 6-bit word can be placed in the 24 bit read-write register in four different locations; first 6 bits, second 6 bits, etc. Its position in the register is determined by the states of FF4, 5. To this point what is described is well known to those knowledgeable in the ferrite-core memory field.

It is to be noted that in selecting an x and a y current that if the y address (states of FF8, 9, 10) is not changed but the x address does change on successive memory operations, then the same row is selected each time but the columns change. The contribution of this invention is the operation of the counting flip-flops 1–10 of FIGS. 1, 4, 5. The counters are connected to each other (output to next input) to form a simple ripple counter. If their outputs are connected to the inputs of the memory address register within the dash-dot rectangle a direct parallel transfer of data can take place. As the counter flip-flops change states the rows and columns within the core stack itself are selected and controlled. Two gating structures are also shown on the counter. When writing into the memory the counter operates as sewn in FIG. 4 of the application and when reading from the memory the counter sequence is that as shown in FIG. 5 of the application. The memory address register (FF1-10) can be directly replaced with *FFL*, *FFW*, *FFG* and *FFH*.

As to the temporary holding register (101 of FIG. 1) it is to be noted, as described above, that in the operation of the memory, when an x and y current are selected, all 24 bits of that particular word are affected. Thus when a single 6 bit data word is written into the memory the other 18 bits are affected. If the FFW portion of the counter has advanced beyond the 00 state data has already been written into the first 6 bit section of the memory words. When writing data into a subsequent 6 bit section, the previously written data has to be preserved and rewritten along with the new data. The temporary holding register serves that function. It can in reality be the same as the memory read-write register or can be a separate register whose inputs come from the sense amplifiers and whose outputs go to the inhibit drivers.

While a preferred embodiment has been disclosed herein, many modifications thereof are feasible. This invention is not to be restricted except insofar as is necessitated by the spirit of the prior art.

I claim as my invention:

1. The method of operating a pulse-doppler moving-target radar system including a receiver and a plurality of range channels connected to said receiver, a single filter bank for all range channels connected to said channels to determine the wave form of the signals received by said receiver, the said method comprising passing, at each of a plurality of successive intervals, through the range channels in succession, in the order in which they are received a cycle of analogue signals corresponding to the instantaneous magnitudes of the received signals, a separate analogue signal being passed through each of the range channels, converting each of the separate analogue signals in the succession in which it passes through its corresponding range channel into a digital signal, storing said digital signals in the order in which they are converted in selected locations or addresses in a memory, each signal being stored in a location as a word formed of a plurality of bits, there being a one-to-one correspondence between each location and the order of receipt of the signal stored therein, after all the signals through all range channels have been so stored selectively removing from their stored locations, and converting the said digital signals for each range channel in its turn in succession into analogue signals, predetermined numbers of said plural bit words being removed and converted in succession for each range channel until all signals for said last-named range channel are removed, and converted, and transmitting said last-named analogue signals in the succession in which they are converted (that is channel by channel) through said filter bank.

2. The method of claim 1 wherein the digital signals are stored in a memory of the type in which the storing of a later-stored signal affects the storing of an earlier-stored signal, the said method comprising temporarily removing from said memory and holding in a temporary holding register all earlier-stored signals before a later-stored signal is stored, and simultaneously with the later storing of said later-stored signal restoring to the memory the earlier-stored signals held in said temporary holding register.

3. The method of claim 1 wherein in the conversion from digital to analogue signals the predetermined number of the plural bit words stored during a plurality of successive intervals are converted to analogue signals simultaneously.

4. The method of claim 1 wherein the digital signals are removed as a predetermined number of plural bit words in substantially the same order in which the signals are stored individually in the locations.

5. The method of claim 1 wherein the memory core is a three-dimensional array of storing elements, extending in length, width and heighth, and wherein the converted digital signals are stored in succession in the elements in successive rows along the heighth dimension, which rows extend in length and width and wherein on removal of the digital signals, the digital signals are removed from the rows in the order in which they are stored but a plurality of digital signals extending in width are removed simultaneously on each removal operation.

6. A pulse-doppler moving-target radar system including a receiver for receiving signals from targets, a plurality of range channels connected to said receiver, separate range gates connected in each of said range channels enabling said channels in succession, during sampling intervals, each channel to pass in its turn a sample of a signal, if any received, corresponding to the range of said last-named channel, sampling means in said channels, each to pass said samples received by said receiver during the corresponding sampling intervals, cycles of said samples being passed repeatedly through said channels each in its turn during each of a plurality of successive intervals, a separate analogue-to-digital converter connected to each channel for converting the samples of the signals passed by said last-named channel, in the succession in which they are passed, into digital magnitudes, memory means connected to said analogue-to-digital converter, first means connected to said memory means for actuating said memory means to store the digital magnitudes of said converter in the order in which they are passed by said channels, each magnitude being stored in a predetermined address in said memory means which address corresponds to the order in which said last-named magnitude is stored, and each address and each magnitude being stored in said address as a plural bit word, digital-to-analogue converting means connected to said memory means, second means connected to said memory means for actuating said memory means to pass to said digital-to-analogue converting means the digital magnitudes for each range channel in its turn in succession, a predetermined number of said plural bit words being passed in succession for each said range channel, and unitary filter means connected to said digital-to-analogue converting means for receiving, in filtering relationship, the analogue signals from said digital-to-analogue converting means channel by channel in the order in which said digital-to-analogue converter means receives the digital signals.

7. The apparatus of claim 6 wherein the memory means is of the type in which the storing of a later-stored signal affects an earlier-stored signal, the said apparatus including a temporary holding register and means cooperative with said memory means and temporary holding register for transferring all earlier-stored signals subject to be affected by a later-stored signal to said temporary holding register and thereafter, responsive to the storing in said memory means of said later-stored signal, simultaneously with said later-stored signal restoring to said memory means said transferred earlier-stored signals.

8. The apparatus of claim 6 wherein the memory means includes a plurality of memory elements which may be regarded as located in blocks in a parallelapiped, each block having a location in a column rows of the parallela-piped and wherein the first means includes a first counter for setting the row of columns along one dimension of a block of a plurality of blocks of columns where a memory element to receive a signal is located, a second counter for setting the position along the row of columns where the said last-named element is located, a third counter for setting the block of columns in which the last-named element is located, and a fourth counter for setting the position along the selected column in which the last-named element is located.

9. The apparatus of claim 8 wherein the second means includes the third, fourth, and first counters and the third counter actuates the memory means to transfer all signals in a row, of a column selected by the fourth and first counters simultaneously to the digital-to-analogue converter.

10. The system of claim 6 wherein the memory means is a three dimensional array of memory elements arrayed in length, width and heighth, and wherein the first means stores the digital magnitudes successively in elements of successive rows extending along the heighth dimension, said rows extending in length and width, and wherein the second means actuate the memory means to pass the digital magnitude stored in rows in the order in which the magnitudes are stored in the rows, but for each row, all magnitudes along the width of said last-named row simultaneously.

* * * * *